United States Patent [19]
Timms et al.

[11] Patent Number: 5,799,922
[45] Date of Patent: Sep. 1, 1998

[54] LOW PROFILE SEAT SUSPENSION

[75] Inventors: Daryl B. Timms, Springfield; Wilhelm F. L. Sturhan; Gerhard Hellweg, both of Battle Creek, all of Mich.

[73] Assignee: Seating Technologies, Inc., Battle Creek, Mich.

[21] Appl. No.: 732,521

[22] Filed: Oct. 15, 1996

[51] Int. Cl.[6] .................................................. F16M 13/00
[52] U.S. Cl. ........................................... 248/564; 421/588
[58] Field of Search ................................. 248/550, 430, 248/424, 429, 431, 575, 421, 561, 587, 584, 564, 588

[56] References Cited

U.S. PATENT DOCUMENTS

| | | | |
|---|---|---|---|
| 3,698,673 | 10/1972 | Olsen | 248/421 |
| 3,741,512 | 6/1973 | Olsson | 248/421 |
| 4,168,819 | 9/1979 | Ducrocq | 248/631 |
| 4,946,145 | 8/1990 | Kurabe | 248/564 |
| 5,004,206 | 4/1991 | Anderson | 248/631 |
| 5,169,112 | 12/1992 | Boyles et al. | 248/550 |
| 5,388,801 | 2/1995 | Edrich et al. | 248/564 |

Primary Examiner—Leslie A. Braun
Assistant Examiner—Gwendolyn Baxtert
Attorney, Agent, or Firm—Young & Basile, P.C.

[57] ABSTRACT

A vehicle seat suspension for trucks and the like characterized by its low profile, ease of operation and adjustment and safety utilizing a scissors linkage. The lower ends of the linkage are attached to a base plate affixed to the truck frame and the upper links are attached to a seat bracket utilizing guides and slides to selectively permit fore and aft oscillation of the seat. The scissors linkage is supported by an air spring system and shock absorber, the seat bracket assembly is bolted to reduce distortion and a dual diameter roller system provides accuracy, reduces movement, and the seat bracket is connected to the vehicle frame through the scissors link lower pivot anchor by flexible tension members permitting the seat belts to be attached to the seat or seat bracket.

1 Claim, 3 Drawing Sheets

LOW PROFILE SEAT SUSPENSION

BACKGROUND OF THE INVENTION

1. Field of the Invention

The invention pertains to seat suspensions for trucks and industrial vehicles capable of absorbing vertical and horizontal vibrations, permitting extensive vertical adjustment, and permitting the occupant passenger safety belt to be mounted directly to the seat while meeting required standards.

2. Description of the Related Art

Complex seat supports for trucks, construction equipment, and industrial applications wherein the vehicle is subjected to extensive vibrations and impact have been designed to minimize the transfer of such forces to the seat occupant, usually the vehicle driver. A variety of linkage systems have been employed to support vehicle seats, and scissors type linkage suspensions are known as used in seat suspensions as shown in U.S. Pat. Nos. 3,558,188; 4,286,765; 4,461,444; 4,729,539; 5,251,864 and 5,261,724. While such scissors type seat suspensions are capable of absorbing many of the vibrations and impacts imposed upon the vehicle, known seat constructions have a number of disadvantages arising from their mode of construction, and arrangement of components. Known vehicle seat suspensions of the scissors type do not have a relatively low vertical profile, and are restricted in the degree of seat vibration absorption available.

Government seat belt requirements mandate that supports for seat belts be so anchored as to effectively resist the high forces imposed upon the seat belt during impact. Most vehicle seat suspension systems are not of such character and strength as to permit a three point seat belt to be directly attached to the seat, but rather the seat belt must be attached to the vehicle frame structure which creates a nuisance and problems with respect to seat adjustment. With vehicle frame mounted seat belt systems, the seat belt must be readjusted each time that the position of the seat is adjusted, and it is necessary for the seat occupant to adjust the seat belts each time the seat height or horizontal position is varied and frame mounted three point seat belts restrict vertical passenger movement and are uncomfortable during vertical seat oscillation.

While it is highly desirable to be able to mount a three point seat belt structure directly to the seat so as to move therewith and thereby eliminate adjustment of the belt structure each time the seat is occupied, known vehicle seat suspensions are not usually of such strength and rigidity as to permit the seat belt anchors to be attached thereto.

OBJECTS OF THE INVENTION

It is an object of the invention to provide a vehicle seat suspension of the scissors linkage type wherein the seat suspension is of sufficient rigidity to permit integrated three point seat belt systems to be directly attached thereto.

Another object of the invention is to provide an independently supported vehicle truck seat having a scissors type linkage suspension wherein the seat structure is of a low profile and is capable of effectively absorbing vertical and horizontal vibrations and movements.

An additional object of the invention is to provide a vehicle seat suspension of the scissors linkage type wherein seat structure mounted upon the upper portions of the linkage is capable of forward and rear movement upon a roller and slide type bracket to absorb horizontal vibration.

An additional object of the invention is to provide a scissors type linkage vehicle seat suspension wherein the seat bracket structure mounted upon the upper region of the linkage is bolted, rather than welded, to the linkage structure minimizing distortion and other problems attendant with welding to ensure smooth adjustment and uniform vibration absorbing seat characteristics.

Yet another object of the invention is to provide a vehicle seat suspended on a scissors type linkage wherein the structure permits an integrated isolator to be incorporated into the seat for absorbing vibrations, and wherein the seat suspension structure is suitable for withstanding and absorbing high forces.

SUMMARY OF THE INVENTION

The truck seat suspension of the invention utilizes a scissors linkage wherein the linkage includes two sets of links pivotally interconnected at their central regions each link having a lower end and upper end. The lower end of one of the links of each set is pivotally connected to a pivot anchor affixed to a base plate, while the other lower end of the associated link is slidably supported on the base plate to permit raising and lowering of the upper ends of the links as the linkage is extended and contracted in the known manner.

At its upper end of the suspension, the link pivotally mounted to the base plate is mounted to seat structure by a sliding arrangement, while the link of each set slidably connected to the base plate is pivotally mounted to a seat bracket. Accordingly, the seat bracket will remain parallel to the base plate as the linkage is raised and lowered.

A compressed air unit of the expansible chamber type determines the vertical position and extension of the linkage suspension, and shock absorbing apparatus interposed between the base plate and seat bracket absorbs vertical vibrations and impacts.

The seat bracket assembly is bolted together to avoid the distortion and warping often attendant with welded assembly units and the seat bracket includes a roller and guide arrangement which permits fore and aft movement of the seat upon the links. A locking arrangement mounted upon the seat structure permits the seat to be locked to its guide system with respect to horizontal movement.

To provide optimum occupant comfort, and minimize the seat belt attachment procedure, the seat belts are directly attached to the vehicle seat structure thereby requiring only initial belt adjustment to the occupant, and thereafter such adjustment will be maintained. To meet government requirements, the seat suspension for seat mounted belt anchoring must be sufficiently rigid, and in accord with the invention, safety and government regulations are met by the use of flexible tension members interposed between the seat bracket and the lower linkage pivot brackets wherein the lower end of the tension members are directly affixed to the bracket and the vehicle frame and the seat of the invention permits a three point seat belt system to be solely anchored to the seat structure.

The utilization of the above features permits a low profile truck or industrial vehicle seat to be manufactured capable of effectively absorbing both vertical and horizontal vibrations to produce maximum driver comfort, and seat belt anchor standards are met due to the use of the flexible tension members attached to the linkage upper region and the anchor belt lower region adjacent the vehicle frame.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

The truck seat suspension assembly of the invention is generally indicated at 10 and includes the base plate 12 which is attached to the vehicle floor and frame as to be rigidly affixed to the vehicle. As will be appreciated from FIG. 1, the primary element of the suspension 10 is a scissors linkage 14, and the scissors linkage 14 supports a seat bracket generally indicated at 16 at the upper portion of the linkage.

The scissors linkage 14 consists of two sets of pivotally interconnected links, the outer link of each set being represented at 18 and the inner link being shown at 20. The links of a common set are interconnected by a pivot 22 located at the central region of the links.

Figure 2:
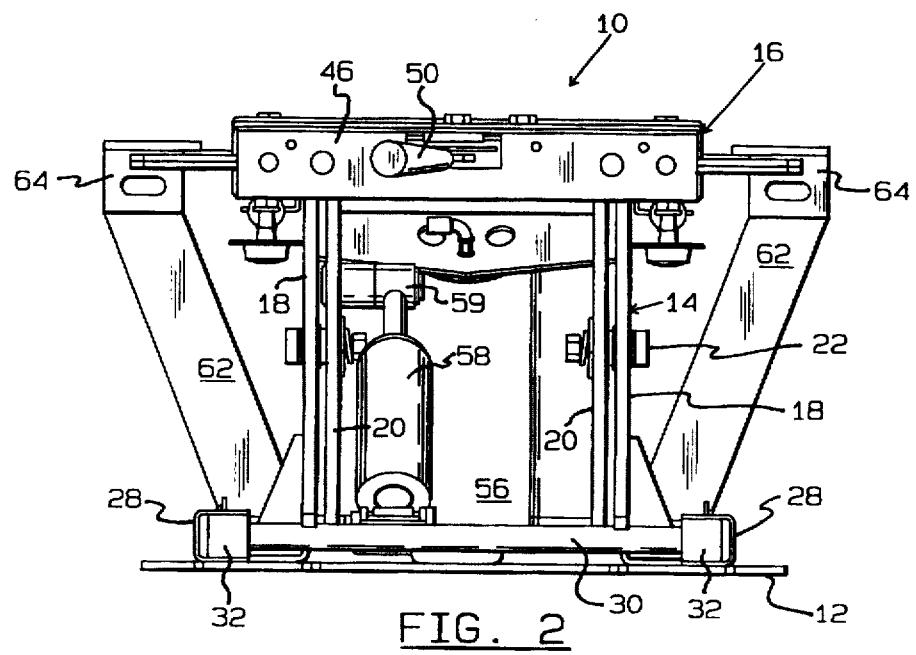
FIG. 2 is a front elevational view of the seat structure as taken from the left of FIG. 1.
Figure 3:
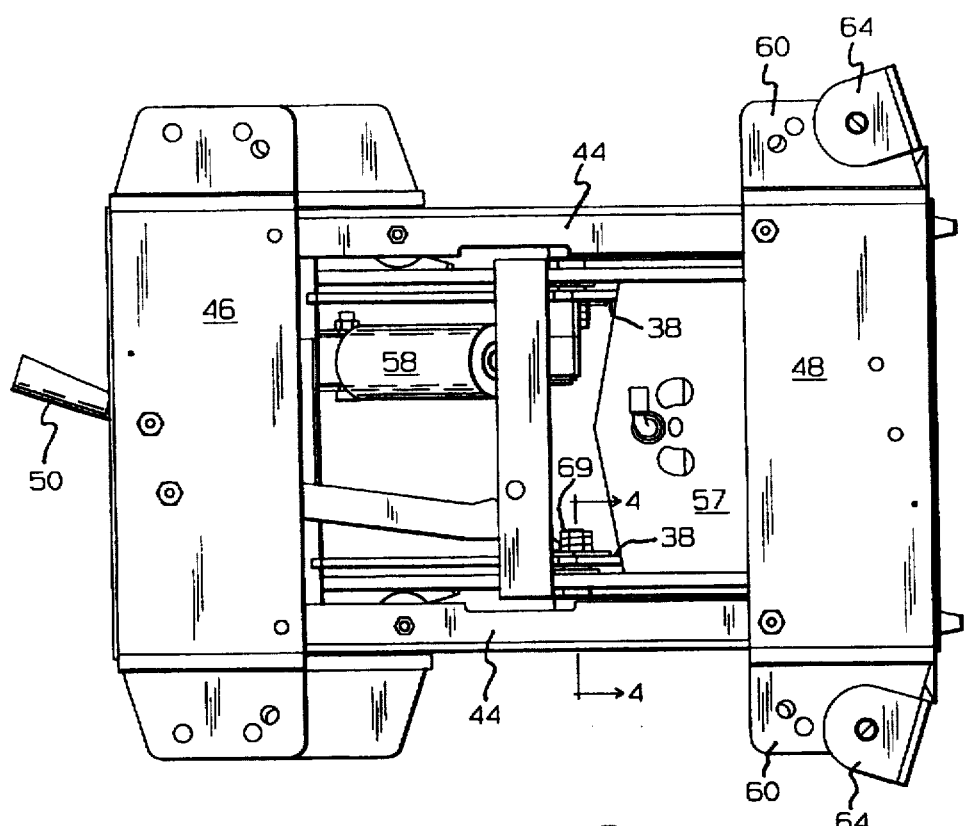
FIG. 3 is a plan view of the seat structure.

A pair of anchor brackets 24 are mounted adjacent the rear edge of the base plate 12 as will be appreciated from the drawings. The U-shaped anchor brackets 24 include holes through which the pivot pin 26 extends, and the pivot pin 26 extends through holes located in the lower ends of the inner links 20 pivotally connecting the inner links 20 to the base plate 12. Parallel channel guides 28 affixed to the front edge of the base plate 12 are in alignment with a roller shaft 30 mounted at the lower ends of the scissors linkage links 18, and the roller shaft 30 includes rollers 32 at its outer ends which each closely rotatably associate with a channel guide 28 as will be appreciated from FIG. 2.

Figure 4:
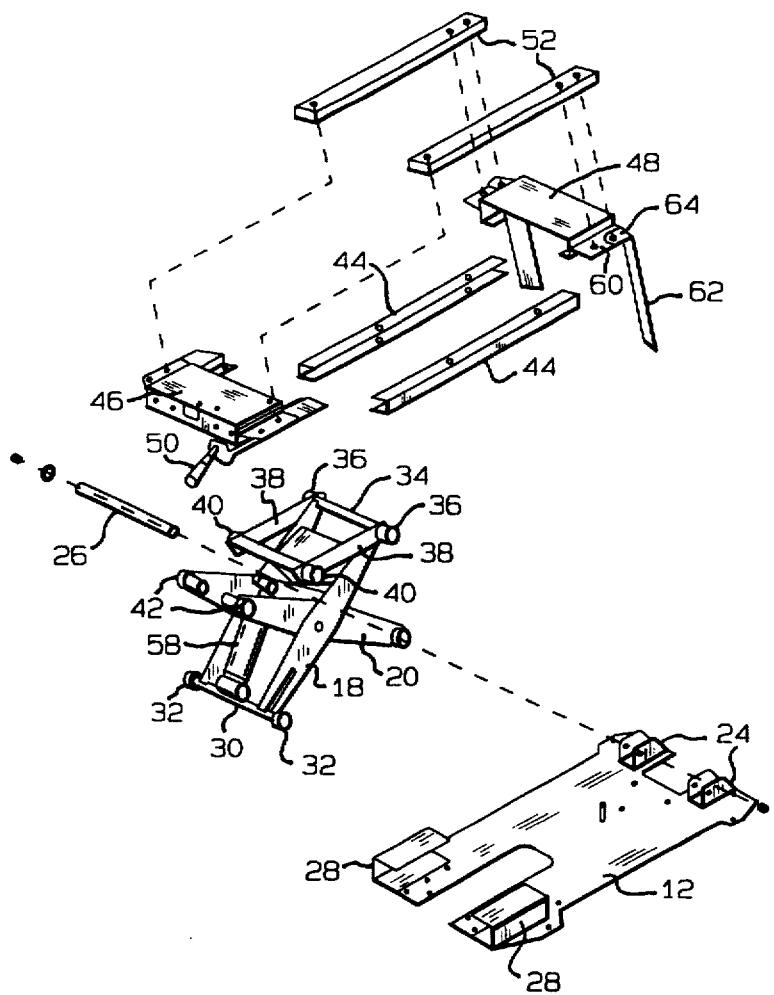
FIG. 4 is an exploded perspective view of the primary seat suspension structure.

A roller shaft 34 is affixed to the upper ends of the outer links 18 as will be appreciated from FIG. 4, and rollers 36 are mounted upon the ends of the shaft 34. Extensions 38 mounted upon the roller shaft 34 include rollers 40, and rollers 42 are mounted upon shafts affixed to the upper ends of the inner links 20 as will be appreciated from FIG. 4.

The rollers 36, 40 and 42 on a common side of the suspension 10 are linearly related, and such rollers are received within a channel shaped guide 44. Likewise, on the opposite side of the suspension 10, a guide 44 receives the other rollers 36, 40 and 42. In this manner, the guides 44 are supported upon the rollers 36, 40 and 42 wherein the guides 44 are readily linearly movable upon their supporting rollers.

The guides 44 are interconnected at their front ends by the front bracket assembly 46, and are interconnected at their rear end by the rear bracket assembly 48. The assemblies 46 and 48 are bolted to the guides 44, and such bolted assembly is preferred over welding fabrication as distortion and other alignment problems arising from the heat of welding are eliminated.

A lock lever 50 is mounted upon the front seat bracket assembly 46 and the lock lever 50 operates mechanism within the assembly 46 which locks the seat bracket 16 to its supporting rollers preventing relative movement on the rollers 36, 40 and 42. Such locking means may be of any conventional nature and its specific construction and operation are within the scope of one skilled in the art.

Figure 1:
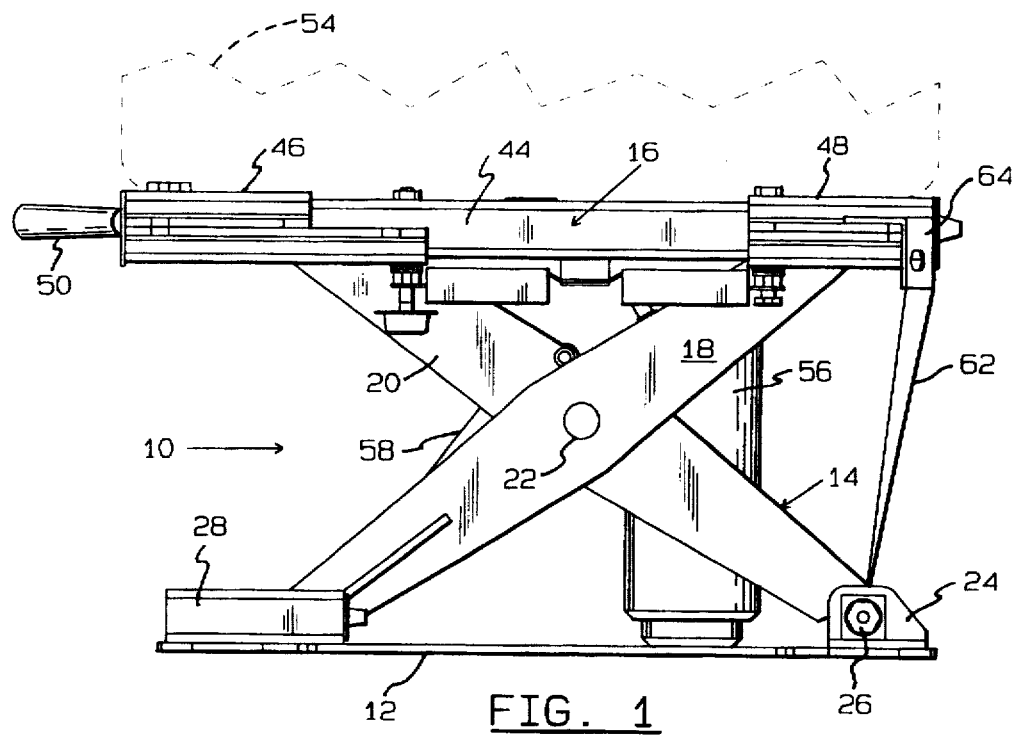
FIG. 1 is a side elevational view of a vehicle seat suspension in accord with the invention, the seat structure, per se, being schematically illustrated.

Seat support rails 52 are bolted upon the assemblies 46 and 48 and the seat support rails 52 constitute the support for the vehicle seat 54 shown in dotted lines in FIG. 1. The seat 54 may take any desired configuration or form, and is usually of an upholstered nature having contours to provide optimum comfort and cushioning.

The vertical position of the seat 54, and the degree of vertical extension or retraction of the scissors linkage 14 is determined by an expansible chamber air cylinder 56 interposed between the base plate 12 and the plate 57 affixed to the extensions 38. Additionally, vertical forces imposed upon the seat bracket 16 are absorbed by the shock absorber 58 extending from the roller shaft 30 to a link 20 by pivotal boss 59, FIG. 2.

The rear bracket assembly 48 includes wings 60, FIG. 4, and nylon fabric tension webs 62 are attached to the wings 60 by means of web upper brackets 64. The lower end of the tension webs 62 is looped about and affixed to the pivot pin 26 whereby high tension forces can be transmitted through the webs 62 between the anchors 24 and the seat bracket 16.

The aforedescribed seat construction permits a low profile vehicle seat to be produced which is of a high strength character, yet permits full adjustment of the seat 54 to occur. Depending on the extension of the air cylinder 56, the height of the seat 54 with respect to the base plate 12 may be accurately regulated, vertical vibrations and shocks imposed upon the seat are absorbed by the shock absorber 58. If the seat bracket 16 is not locked with respect to the rollers 36, 40 and 42 by the lock lever 50, the seat 54 is free to move in a direction parallel to the direction of vehicle movement permitting forces and vibrations parallel to this direction to be readily absorbed.

By attaching the seat bracket 16 to the base plate 12 and indirectly to the vehicle frame by means of the tension webs 62, the seat bracket 16 is sufficiently retained against forward movement in the event of a crash to permit the required seat belts to be attached to this structure of seat 52 or the seat bracket 16 yet the flexibility of the webs 62 does not interfere with seat adjustment. Accordingly, by mounting the seat belt structure to the seat or seat bracket, adjustment of the seat belt structure as the seat is moved forward or rearwardly is not required, and the ease of use of the vehicle seat with respect to the occupant is substantially simplified as compared to arrangements requiring that the seat belt structure be mounted to the vehicle frame.

It is appreciated that various modifications to the inventive concepts may be apparent to those skilled in the art without departing from the spirit and scope of the invention.

We claim:

1. A vehicle seat suspension for a vehicle having a frame characterized by its low profile, lack of distortion, ease of adjustment and safety, comprising, in combination, a scissor linkage having first and second sets of outer and inner links, each link having a central region and upper and lower ends, said central regions of a set of links being pivotally interconnected, a first anchor bracket pivotally supporting said lower end of one of said links of a set, a second anchor bracket slidably connected to said lower ends of the other of said links of a set, a seat mounting bracket mounted upon said link's upper ends, said seat mounting bracket consisting of a pair of parallel channels each having parallel legs having ends, a front bracket assembly affixed to one end of said channels, and a rear bracket assembly affixed to the other end of said channels, rollers mounted upon said links' upper ends received within said channels' legs, and seat support rails affixed to said front and rear bracket assemblies, bolts solely affixing said channels to said front and rear bracket assemblies, and bolts solely affixing said seat support rails to said front and rear bracket assemblies whereby said bolted interconnections eliminate distortion of said channels and rails.

* * * * *